Figure 1:
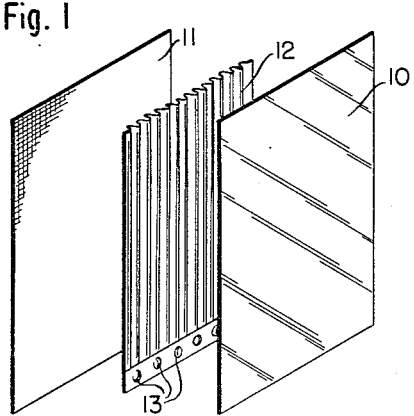

April 16, 1957 H. BOEDDINGHAUS ET AL 2,788,901

FUSED EDGE FILTER UNIT

Filed Oct. 11, 1954

INVENTORS
Hugo Boeddinghaus
Arthur C Wrotnowski
By Kenway, Jenney, Witter & Hildreth,
Attys.

United States Patent Office 2,788,901
Patented Apr. 16, 1957

2,788,901

FUSED EDGE FILTER UNIT

Hugo Boeddinghaus and Arthur C. Wrotnowski, Greenwich, Conn., assignors to American Felt Company, Glenville, Conn., a corporation of Massachusetts Application October 11, 1954, Serial No. 461,422

2 Claims. (Cl. 210—486)

This invention comprises a new and improved filter unit having a stiff fused edge frame and a body pervious to air or liquid. The invention may be embodied in many various forms as required by different types of filter apparatus, but in all its embodiments it comprises essentially superposed sheets of compressed felted thermoplastic fibers fused together in marginal portions and thus providing an enclosure with the stiff impervious frame and a liquid permeable body. The outer sheets of the filter enclose a drainage separator leading to an outlet opening formed at one edge of the enclosure and communicating with outlet connections whereby the filtered effluent may pass from the enclosed interior of the unit.

In its preferred form the filter of our invention is prepared from a blend of approximately 20% Vinyon and 80% Dynel fibers in weight of about 30 ounces per square yard. The carded batt is pressed between protective sheets in a platen press and in this operation any desired surface pattern is imparted to the sheets. For example, one surface may be embossed or roughened and the other surface made paper-smooth. A sheet of such material should have an air permeability of about one to three C. F. M. per square foot for an air pressure corresponding to ½" of water or three to eight gallons of water per sq. ft. at 1 p. s. i. pressure. However, the density may be varied depending on what is needed for the specific type of filtration for which the filter is intended.

The function of the separator is to hold apart the sheets which form the body of the filter and to afford free passage of the effluent to the outlet connections. The separator may comprise vinyl resin sheeting or other chemically resistant and heat-stable material formed into a suitable drainage pattern of corrugations, bosses or the like.

The fused edge filter leaf of our invention has a wide field of use and constitutes a greatly improved substitute for filter units of similar shape and size which have been heretofore constructed of fine mesh stainless steel and covered with wire cloth or fabric and used for filtering water or in such industries as the manufacture of acid and alkaline chemicals, beet sugar, beer, corn products, fruit juices, paper and petroleum. In many of such uses filter units of metal construction have relatively short life due to corrosion or electrolysis, and the expense of replacement is a serious factor of operating cost. Our improved fused edge filters are not only lighter and more convenient to handle, but are not subject to the deterioration encountered in the use of metal filter units. They are also of lower cost and may be constructed to operate with optimum ease of filter-cake removal. They are chemically, electrically, and biologically stable, have an ample flow rate and may readily be fashioned in an infinite variety of shapes.

Figure 2:
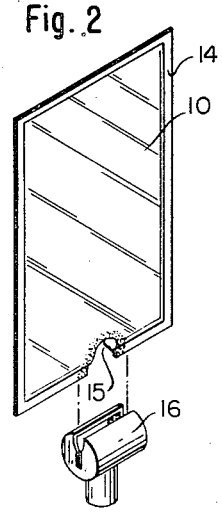
Figure 3:
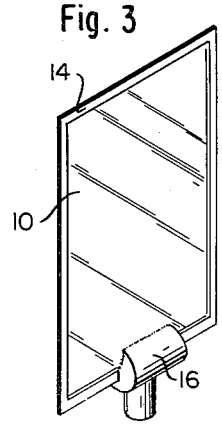
Figure 4:
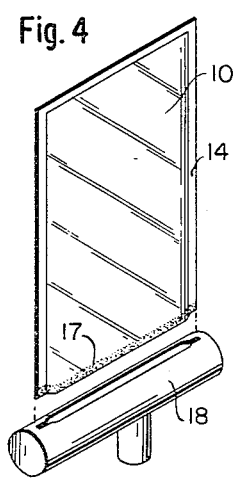
Figure 5:
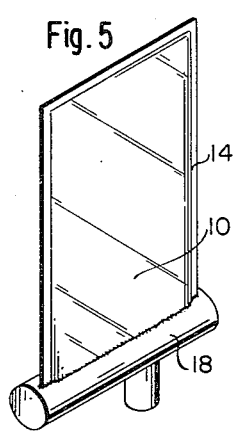
Figure 6:
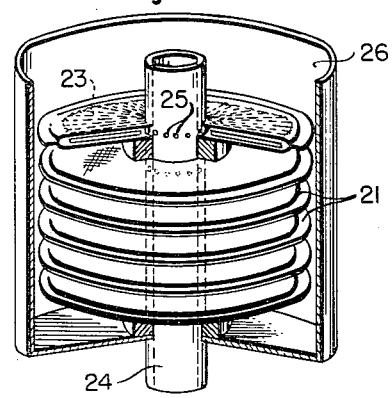
Figure 7:
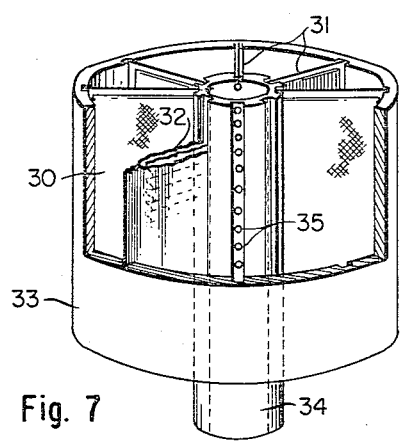
Figure 8:
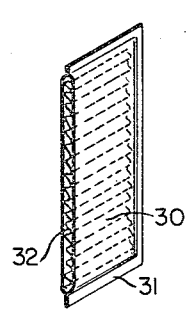
Figure 9:
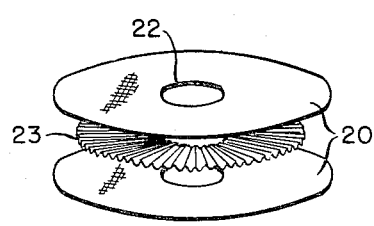

These and other features of the invention will be best understood and appreciated from the following description of several embodiments thereof selected for purposes of illustration and shown in the accompanying drawings in which:

Fig. 1 is a view in perspective of rectangular thermoplastic sheets and filter ready to be assembled in a filter unit, Figs. 2 and 3 are views in perspective of the unit with its outlet connections, Figs. 4 and 5 are similar views of the unit with modified outlet connections, Fig. 6 is a view in perspective showing a portion of filter apparatus including fused edge circular filter units, Fig. 7 is a similar view of apparatus having radially arranged fused edge filter units, Fig. 8 is a view of one of the units of Fig. 7, and Fig. 9 is a view of the component parts used in making up a fused edge circular unit.

In Figs. 1–5 are shown rectangular filter sheets intended primarily for use in apparatus employing as many as 18 to 20 vertical filter units, all mounted in horizontal series with uniform spacing. Each unit has an outlet connection at its lower edge and the whole assembly is mounted in a carrier so that it can be moved into and out of a horizontal casing or drum into which the fluid to be filtered is introduced. The fluid is distributed about the filter unit assembly and is filtered by passing inwardly through the vertical walls of the units, the filtrate passing from the individual units to an outlet manifold. Meanwhile the solid material forms filter cakes in the spaces between the filter units. The filter cakes are periodically removed by washing or scraping while the carrier and its filter units occupy their exposed position outside the drum, after which the carrier is restored to operative position within the drum.

It is advantageous to form the outer faces of the filter units paper smooth in order to facilitate removal of the filter cake, and with that purpose in view the fibrous batts prepared from a blend of Vinyon and Dynel fibers are pressed in contact with protective sheet material in a platen press with a pressure of about 50 p. s. i. at 230–240° F. The filter units shown in Figs. 1 to 5 comprise rectangular sheets and of these it may be assumed that the outer faces 10 are subjected to pressure against a sheet of glassine or other smooth material so that they acquire a body stiffness sufficient to maintain the shape initially imparted to it and a paper smooth finish. Similarly, the inner faces 11 of the sheets may be pressed against a woven fabric or an embossed molding sheet and by such treatment acquire a slightly roughened or finely corrugated surface.

Each filter unit includes with its enclosure a separator, and as herein shown this may comprise a corrugated rectangular sheet 12 formed of the same fibrous structure as the outer sheets except that it is shaped by the action of corrugated male and female dies. The corrugations do not extend to the lower edge of the sheet but are interrupted by a transverse zone having a series of rounded projections or bosses 13. Other materials may be employed for the separator so long as it serves to maintain the outer sheets in spaced relation and permit free flow of the filtrates to the discharge connections.

After these component fibrous thermoplastic sheets have been made, they are cut to predetermined size and plied or superposed with the separator sheet in the center. There now follows a pressing operation between heated platens shaped to compress and fuse together the peripheral edges of the component sheets forming thereby a stiff impervious marginal frame 14. As shown in Figs. 2 and 3 a recess 15 is formed in the lower edge of the unit to serve as a discharge opening. The filter is completed by inserting its lower edge in a discharge connection comprising a metallic head 16 slotted to embrace the lower edge of the filter unit and enclose the discharge recess 15. The head 16 is connected to the discharge manifold of the filter unit assembly.

In forming the filter unit shown in Figs. 4 and 5, the compressing and fusing dies are shaped to seal only three edges of the filter unit, leaving the lower edge 17 unsealed and opened. This unsealed discharge edge is inserted in a discharge head 18 suitably shaped to make a fluid-tight seal with the walls of the filter unit.

In Figs. 6 and 9 the filter unit of our invention is shown as embodied in circular or disk form. Each unit comprises a pair of disks 20 prepared as before from a blend of Vinyon and Dynel fiber of the desired surface texture and fused together in a stiff circular frame 21. The sheets 20 are separated by a radially corrugated separator 23 which may be of any suitable material and all components of the filter have a central perforation 22 of the proper size to fit snugly upon a vertical discharge pipe 24. The individual filter units may be spaced apart by collars threaded on the pipe 24 and the pipe itself is provided with a circle of perforations 25 at the level of each filter unit. In operation the fluid is filtered by passing through the upper and lower walls of the filter units, the solid matter is deposited as filter cake between them, and the filtrate discharged through the pipe 24.

Still another embodiment of our invention is shown in Figs. 7 and 8 where the filter units 30 are rectangular in shape and arranged in vertical radial relation. Each unit 30 comprises fibrous thermoplastic sheets having a stiff marginal frame about three edges and containing in their enclosure a corrugated separator 32. The filter units are held in spaced radial relation in vertical ways provided in the inner surface of a vertical drum 33 and the outer surface of a vertical discharge pipe 34. The unfused edge of the filter units are received in the ways of the discharge pipe 34 and in each instance are located opposite a row of discharge perforations 35 in these ways. The fluid to be filtered passes transversely through the walls of the filter units while the filtrate passes through the perforations 35 and out through the pipe 34. Meanwhile the solid material deposits as filter-cake between the filter units.

It will be apparent that in all of the embodiments above discussed the individual filter units are relatively light and may be conveniently handled for replacement, cleaning or inspection.

While we have specifically referred to Vinyon and Dynel as suitable thermoplastic fibers for the construction of our improved filter unit, it will be apparent that any other equivalent synthetic plastic fibers may be employed within the scope of our invention. Dynel is the trade designation of a synthetic fiber made by copolymerization of 40% acrylonitrile and 60% vinyl chloride and is readily obtainable in the open market.

The filter sheets have been referred to as being in weight 30 oz./yd. but the density may be varied depending on what is needed for the specific type of filtration for which the filter is to be used. For example, a filter sheet weighing 10 oz./yd. is suitable for use in some fields and a unit of that construction is somewhat less stiff and rigid than one constructed of 30 oz. sheets. In general the specific gravity of the filter sheets will be found to be 0.55 to 0.65 in a thickness of 0.020 to 0.025. By varying the weight of the original batt the resulting filtration action of the unit may be adjusted as desired. While we prefer to employ thermoplastic fibers of the type above discussed a small proportion of non-thermoplastic fibers, such for example as glass fiber, may be included if desired.

The outlet of the unit may be formed in any location required by the general character of the whole filter apparatus and the size of the unit may be reduced if desired to fit in hydraulic oil lines or oil and water systems already in operation.

Having thus disclosed our invention and described in detail illustrative embodiments thereof, we claim as new and desire to secure by Letters Patent:

1. A stiff, self-supporting filter unit which is chemically, electrically and biologically stable and comprises superposed rectangular sheets of compressed felted thermoplastic fibers approximately 20% Vinyon and 80% Dynel, the sheets having their inner surfaces embossed and roughened and their outer faces smooth and being fused together about three sides, and a corrugated separator interposed between the unfused portions of the superposed sheets, the separator providing passages leading to the unfused outlet edge of the sheets.

2. A filter unit as described in claim 1 in which the superposed sheets have a specific gravity of 0.55 to 0.65 in a thickness of 0.020" to 0.025".

References Cited in the file of this patent
UNITED STATES PATENTS

| | | |
|---|---|---|
| 2,374,755 | Kisch | May 1, 1945 |
| 2,443,087 | Ulrich | June 8, 1948 |
| 2,444,147 | Walton | June 29, 1948 |
| 2,521,984 | Lang | Sept. 12, 1950 |
| 2,576,864 | Valente | Nov. 27, 1951 |
| 2,654,440 | Robinson | Oct. 6, 1953 |